United States Patent

Constable et al.

[15] 3,650,371

[45] Mar. 21, 1972

[54] ACCUMULATOR TABLE FOR A CONVEYING SYSTEM

[72] Inventors: Charles F. Constable, South Milwaukee; Robert F. Risley, Wauwatosa, both of Wis.

[73] Assignee: Jos. Schlitz Brewing Company, Milwaukee, Wis.

[22] Filed: Nov. 5, 1969

[21] Appl. No.: 874,325

[52] U.S. Cl. .................................. 198/45, 198/29, 198/106
[51] Int. Cl. ......................................................... B65g 47/00
[58] Field of Search ...................... 198/29, 30, 75, 32, 59, 45, 198/106, 20, 26, 28; 214/16 B

[56] References Cited

UNITED STATES PATENTS 2,380,910  7/1945  Newton .................................. 198/106
3,173,557  3/1965  Eliassen ................................. 214/16 B
3,258,105  6/1966  Willsey ................................... 198/30
3,353,651  11/1967  Witmer .................................. 198/32

*Primary Examiner*—Richard E. Aegerter
*Attorney*—Andrus, Sceales, Starke & Sawall

[57] ABSTRACT

A conveying system, including a conveyor and an accumulator table located adjacent the conveyor and sloped downwardly toward the conveyor. When a blockage occurs in the conveyor system, the articles being conveyed accumulate on the inclined table, and when the blockage is cured, the articles will move downwardly across the plate and back onto the conveyor. A vibrating unit can be associated with the inclined accumulator table to vibrate the table and increase the speed of movement of the articles on the table.

16 Claims, 7 Drawing Figures

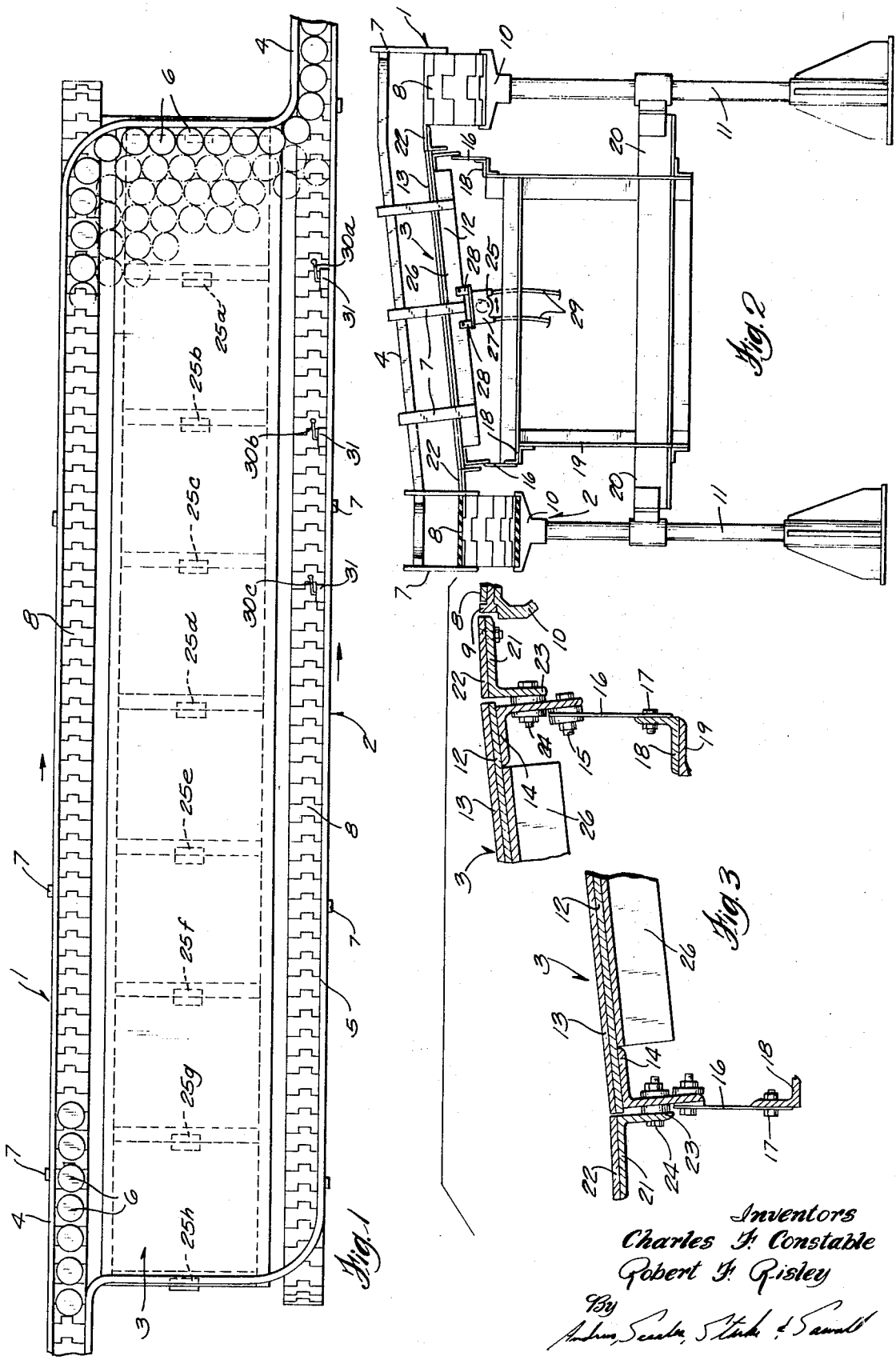

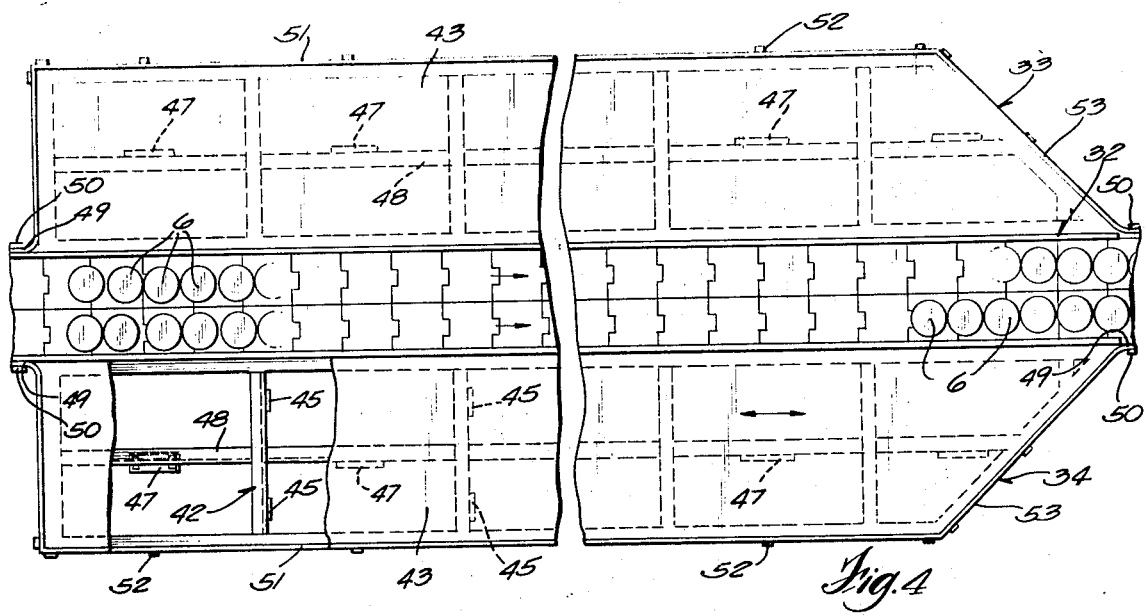
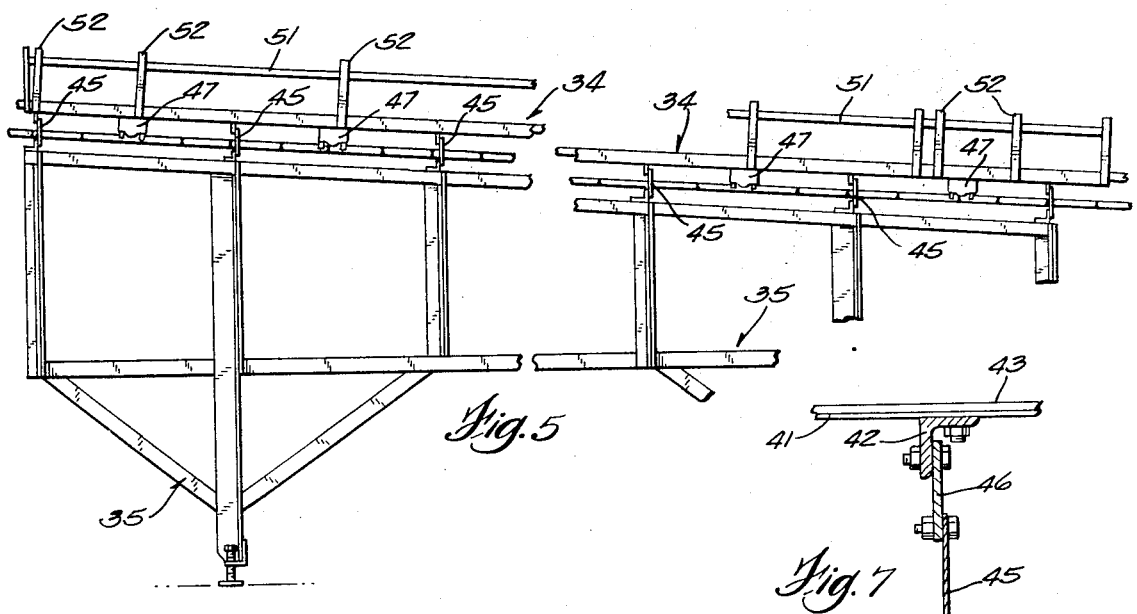
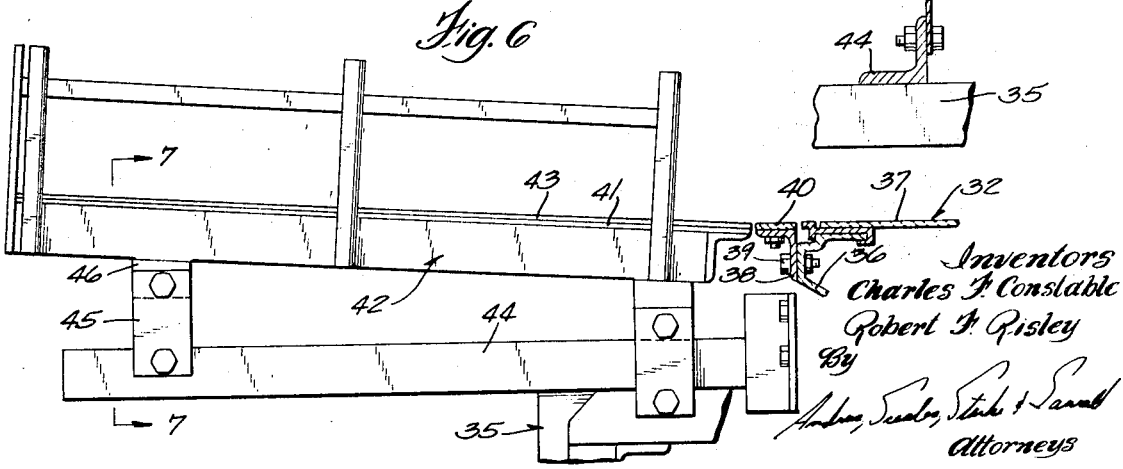

ACCUMULATOR TABLE FOR A CONVEYING SYSTEM

The invention relates to a conveyor system and more particularly to an improved accumulator table for a conveying system.

In a high speed conveying system, such as that utilized in the brewing industry, the cans or bottles are moved through the filling and packaging machines by a series of conveyors. For example, the cans after passing through the filling machine will be successively conveyed through a fill-level detector, a six-pack packaging machine and a master packaging machine. For efficiency in the overall operation, it is desired that the filling machine run continuously without interruption. However, due to the fact that the packaging machines are dealing with paper products, a malfunction or clogging may occasionally occur which results in the interruption of the operation of the packaging machine. Therefore, to prevent shutdown of the filling machine during periods when the packaging machine may be shut down, an accumulator table is normally installed in the conveying system. In the event of a stoppage of the packaging machine, the cans or bottles will accumulate on the accumulator table. After the stoppage is cured, the packaging machine has the ability to operate at a greater speed than the filling machine so that the cans accumulated on the table will be progressively returned to the conveying system. With the use of the accumulator table in the conveying system, the filling machine is able to operate continuously regardless of periodic or intermittent shutdowns of the packaging machine.

The present invention is directed to an improved accumulator table to be used in a conveying system. In accordance with the invention, the accumulator table comprises an inclined or sloping plate which is located between a pair of generally parallel conveyors which are located at different heights or levels. In normal operation, the cans travel over the conveyor of higher elevation and pass over the accumulator table to the lower level conveyor. If a blockage occurs downstream of the accumulator table, the cans or other articles will back up and accumulate on the inclined plate, and when the blockage is cured, the cans will ride downwardly by gravity over the inclined plate to the lower level conveyor to return the accumulated cans to the conveying system.

A provision is also made to incorporate a vibrating mechanism with the inclined plate so that the plate will vibrate in a direction from the upper conveyor to the lower conveyor. The vibratory motion aids in increasing the speed of travel of the cans over the inclined plate.

In a second form of the invention, a pair of accumulator tables are located on either side of a single conveyor. Each of the accumulator tables includes an inclined plate which slopes upwardly from the conveyor. If a blockage occurs downstream of the accumulator tables, the cans or other articles will accumulate on both of the inclined plates, and when the blockage is cured, the cans will move downwardly by gravity across the inclined plates and return to the conveyor. As in the case of the first embodiment, a vibrating mechanism can be associated with each of the accumulator tables to increase the speed of travel of the cans across the surface of the table.

The accumulator table of the invention is substantially less costly than conventional types, such as a walking beam type of accumulator table. The present accumulator table is of simple construction, having few moving parts and thus the initial cost of installation, as well as maintenance, is substantially reduced.

The accumulator table of the invention provides improved accumulating characteristics and is less likely to cause physical damage to the containers than conventional accumulators. As a further advantage, the area of accumulation can be infinitely large without any adverse affect on the overall performance of the conveyor system.

As the accumulator table is elongated in shape, with its long dimension being generally parallel to the path of travel of the articles on the conveyor, the accumulated cans can be returned to the conveyor in a substantially shorter period of time than with accumulator tables of generally square shape.

Furthermore, the accumulator table can be changed in length and width to accommodate the particular conveying system with which it is being utilized.

By covering the inclined table surface with a plastic sheet, not only is the noise level substantially reduced over conventional systems employing metal accumulator tables, but the plastic sheet has a lower coefficient of friction than metal and this improves the speed of accumulation and recovery, as well as eliminating any possibility of galling between the cans and the accumulator surface, as will occur with a metal accumulator table.

Other objects and advantages will appear in the course of the following description.

The drawings illustrate the best mode presently contemplated of carrying out the invention.

In the drawings:

FIG. 1 is a plan view of a conveying system incorporating the accumulator table of the invention;

FIG. 2 is a transverse section taken along lines 2—2 of FIG. 1;

FIG. 3 is an enlarged transverse section showing the construction of the accumulator table to the leaf spring;

FIG. 4 is a plan view of a modified form of the invention in which a pair of accumulator tables are associated with a single conveyor.

FIG. 5 is a side elevation of the structure shown in FIG. 4;

FIG. 6 is an enlarged fragmentary side elevation showing the attachment of the accumulator table to the conveyor frame; and FIG. 7 is an enlarged section taken along line 7—7 of FIG. 6.

FIGS. 1–3 illustrate a conveyor system for conveying articles such as cans or bottles. The conveyor system includes a pair of generally parallel conveyors 1 and 2 with the conveying surface of conveyor 2 being located at a lower level than that of conveyor 1. Extending between the conveyors 1 and 2 is an accumulator table 3, and a pair of guide rails 4 and 5 extend along the conveyor 1, across the accumulator table 3 and along the length of the conveyor 2. The guide rails 4 and 5 define the path of travel of the articles 6 moving along the conveying system. Each of the guide rails 4 and 5 is supported by a series of brackets 7 which extend upwardly from the conveyors 1 and 2 and the accumulator table 3, respectively.

Each conveyor 1 and 2 includes an endless link chain 8 which is driven in an endless path by conventional drive sprockets, not shown, that are located at the ends of the path of travel of the chain. The side edges of the chain 8 are supported in travel by guides 9 mounted on the side members of the frame 10 of the conveyor. Frame 10, in turn, is supported by a series of vertical columns 11 which rest on the foundation or other supporting structure.

The accumulator table 3, which extends between the conveyors 1 and 2, includes an inclined or sloping plate 12, and a plastic sheet 13, formed of a material such as high density polyethylene, is secured to the upper surface of plate 12 and is coextensive with the plate. The plate 12 and plastic sheet 13 are located at an angle of about 3° to 8° with respect to the horizontal and provide a path of travel for the containers 6 from the upper conveyor 1 to the lower conveyor 2.

The supporting structure for plate 12 includes a pair of side angles 14, and bolts 15 connect the vertical flange of angle 14 to the upper ends of a series of leaf springs 16, which are located in spaced relation along the length of the table. The lower end of each leaf spring 16 is connected by bolts 17 to an angle 18 of the generally rectangular frame 19 that carries the accumulator table 3. As best illustrated in FIG. 2, the frame 19 is connected to the vertical columns 11 by brackets 20 and can be adjusted vertically on the columns 11 to vary the elevation of the accumulator table with respect to the conveyors 1 and 2.

Extending outwardly from each side edge of the plate 12 is an angle-shaped extension 21 and the upper surface of extension 21 is covered with a sheet of plastic 22 similar to plastic sheet 13. The extension 21 is disposed at an angle of less than 3° with respect to the vertical and serves to bridge the gap between the side edges of conveyors 1 and 2 and the inclined plate 12. The vertical flange 23 of the extension 21 is connected to the vertical flange of the side angle 14 by a series of bolts 24. Depending on the size and shape of the containers, an abrupt change in angularity from the conveyor 1 to the accumulator table 3, and from the accumulator table to the conveyor 2, may cause tilting or tipping of the containers. Thus, the extension 21 provides a more gradual change of angularity between the conveyors and the accumulator table and minimizes the possibility of tipping of the containers.

While the conveyors 1 and 2 are shown with a width to accommodate a single row of cans or containers 6, it is contemplated that the conveyors can have any desired width to accommodate any desired number of rows of containers. During normal operation of the conveying system, the containers 6 will be conveyed along conveyor 1 in the direction of the arrow and will be guided across the end of the table 3 by the guide rail 4 to the conveyor 2, as illustrated in FIG. 1. In this normal conveying pattern, the table 3 functions as an integral part of the conveying system. The pressure exerted by the containers 6 moving on conveyor 1 in combination with the downwardly sloping attitude of plate 12, enables the containers to move smoothly across the table 3 to conveyor 2. In the event a blockage occurs in the conveying system, downstream of the accumulator table 3, the containers will back up on the conveyor 2 and accumulate on the accumulator table 3, as shown by the containers in phantom in FIG. 1. The accumulator table can be constructed with any desired length and width and will normally have a surface area large enough to accommodate an accumulation of cans occurring during a normal blockage of the conveying system. After the blockage has been cured and the conveyor 2 can again convey the containers 6 downstream, the containers which have accumulated on the table 3 will slide by gravity downwardly along the inclined table surface 12 to the conveyor 2 and will be conveyed by the conveyor 2 to the packaging machine or other downstream work station. In a brewery, the packaging machine normally has the capability of operating 10 to 15 percent faster than the filling machine, so that the increased speed of the packaging machine can remove the accumulation of containers 6 on the table 3 to restore the normal path of travel of the containers, as shown by the containers in solid line in FIG. 1.

A provision is made in the invention to provide the plate 12 with an oscillating type of reciprocating motion in a direction from the conveyor 1 to the conveyor 2 to thereby increase the speed of travel of the containers over the surface of the plastic sheet 13. The vibrating mechanism includes a series of vibrating units 25 which are attached to cross members 26. Cross members 26 extend between angles 14 and are secured to the lower surface of plate 12. Each vibrating unit 25 includes a body 27 and two pair of forked legs 28. The vertical flange of the angle 26 is secured between the forked legs by bolts. The vibrating units 25 can be of any conventional construction and in the type illustrated, a metal ball is rotated in an eccentric path within the body by gas pressure, causing the plate 12 to move in an oscillating or reciprocating path in a direction between the conveyors 1 and 2. The leaf springs 16 provide a flexible support for the plate 12, permitting the table to oscillate with this type of motion. A gas under pressure, such as air, is supplied and returned from the body 28 through lines 29.

It is not necessary in all instances to employ the vibrating units 25, but depending on the size and shape of the containers, as well as the speed of the conveyor system, the vibrating effect can be advantageous in increasing the speed of travel of the containers across the accumulator table. As a measure of economy, a provision is made to operate only the vibrating unit 25a during normal operation of the conveying system. In the event the containers accumulate on the table 3, the other vibrating units can be successively actuated as the accumulation of containers reaches the operating area of each vibrating unit. Thus, the operation of each of the vibrating units 25 is independently controlled by a microswitch 30 which is mounted through a bracket 31 on the guide rail 5. If the containers accumulate on table 3 to a location in the vicinity of the vibrating unit 25a, t the microswitch 30a will be actuated by the pressure of the accumulated containers to thereby operate the vibrating unit 25a. Similarly, as the accumulation of containers continues, the accumulated containers will actuate switch 30b to thereby operate the vibrating unit 25b. This action will continue throughout the entire length of the accumulator table and provides an economy of operation in that only vibrating units in the vicinity of accumulated containers will be operated.

The accumulator table of the invention is substantially less costly than conventional types, such as walking beam conveyors. The accumulator table has a minimum of moving parts which not only reduces the initial cost of the unit, but also substantially reduces maintenance costs. The area of accumulation can be varied as desired by merely increasing the length of the accumulator table and this can be done without any adverse affect on the performance of the conveyors 1 and 2. As the accumulator table has an elongated shape, with the long dimension of the accumulator being parallel to the paths of travel on conveyors 1 and 2, it provides a better recovery of containers into the conveying system after the blockage has ceased. This is a substantial advantage over accumulator tables which have a generally square shape in which case the containers cannot be returned to the conveying line as rapidly after the blockage has been cured.

The plastic sheet 13 provides definite advantages over a metal accumulator table. Not only does the use of the plastic sheet provide a substantial noise reduction, but due to the fact that the plastic has a lower coefficient of friction than metal, the cans can move more freely over the surface of the accumulator table. The use of the plastic surface also prevents any possibility of galling between metal cans and a metal conveyor surface. As a further advantage, the plastic sheet 13 provides a less costly installation, because the plastic sheet can be applied over a carbon steel base, while the conventional metal accumulator table is fabricated from stainless steel.

FIGS. 4–7 illustrate a modified form of the invention which includes a single endless conveyor 32, and a pair of accumulator tables 33 and 34 are located on either side of the conveyor 32. The conveyor 32 comprises a frame 35 that rests on the foundation, and the upper portion of the frame is provided with a pair of side members 36 which support the side edges of an endless link chain 37, similar to chain 8, of the conveyors 1 and 2. As shown in FIG. 5, the conveyor 32 and the accumulator tables 33 and 34 are inclined downwardly in the direction of travel of the conveyor. As best illustrated in FIG. 6, an angle 38 is secured to each side member 36 by bolt 39 and a plastic strip 40 is mounted on the upper surface of the angle 38. The upper surface of strip 40 is substantially flush with the upper surface of the conveyor chain 37.

Each of the accumulator tables 33 and 34 includes an inclined plate 41 which is carried by generally rectangular frame 42. The upper surface of plate 41 is covered with a plastic sheet 43, similar to the plastic sheet 13 of the first embodiment. As in the case of the first embodiment, the plate 41 is disposed at an angle of about 3° to 8° with respect to the conveyor chain 37 as shown in FIG. 6 and the upper flange of angle 38 can be inclined at a lesser angle, up to 3°, to provide a more gradual change in angularity from chain 37 to plate 41.

The accumulator tables 33 and 34 are supported from the conveyor frame 35 by a plurality of beams 44 which extend outwardly from either side of frame 35. Leaf springs 45, similar in structure and function to leaf springs 16, are connected between the beams 44 and bars 46 attached to table frame 42. The leaf springs 45 provide a flexible connection between each of the inclined plates 41 and the supporting structure so that the plates 41 can be oscillated in a direction parallel to the path of travel of the containers on the conveyor 32.

To vibrate or oscillate the plates 41, a series of vibrator units 47, similar to vibrator units 25 of the first embodiment, are secured to longitudinal frame members 48 of frame 42.

The vibrator units 47 operates similar to that previously described with respect to vibrator units 25 and serve to move the plates 41 in a reciprocating path of movement in the direction of the arrows, as shown in FIG. 4.

Guides 49 are mounted on the conveyor frame 35 through brackets 50 and extend along the side edges of the conveyor 32. In addition, guides 51 are mounted on the table frame 42 through brackets 52 and serve to confine the accumulated cans or containers on the tables 33 and 34. The portions of the guides 51 at the downstream ends of the tables 33 and 34, indicated by 53, are located at an acute angle to the longitudinal axis of the conveyor 32 and serve to deflect accumulated containers back toward the conveyor.

During normal operation of the conveying system, the containers will move along the conveyor 32 and will not move onto the accumulator tables 33 and 34. In the event of a blockage down stream, the containers will back up and move upwardly on the inclined plates 41 on both of the accumulator tables 33 and 34. The action of the vibrating units 47, which can be operated either in unison or in sequence, will aid in movement of the containers on the plates 41. After the blockage has been cured, and the containers will again move along the conveyor 32, the increased speed of operation of the packaging machine will enable the accumulated containers on tables 33 and 34 to move back into the line on conveyor 32 to remove the accumulation.

I claim:

1. In a conveying system, conveyor means having a conveying member operating in a given plane to convey a plurality of articles, and an accumulator member having means for disposing said member laterally of the conveyor member and having a generally flat accumulating surface disposed at an acute angle in the range of 3° to 8° with respect to said plane, said accumulating surface having an edge located adjacent to a side edge of the conveyor member whereby the articles can pass freely from the conveyor member to the accumulating surface, means for mounting said conveyor member and said accumulating surface at a downwardly inclined angle in the direction of travel of said conveyor member, guide means located adjacent the lower downstream end of the accumulator surface and extending laterally outward in an upstream direction and at an acute angle with respect to the side edge of the conveyor member, said accumulating surface receiving an accumulation of said articles in the event of a blockage in the conveying system downstream of said accumulator member, and the accumulated articles moving downwardly by gravity on said surface and returning in a diagonal direction to said conveying member when said blockage is cured.

2. The conveying system of claim 1, in which the accumulating surface is formed of plastic.

3. The conveying system of claim 1, and including drive means for moving the accumulating surface in an oscillating path of movement to thereby increase the speed of travel of the articles on said accumulating surface.

4. The conveyor system of claim 3, wherein said drive means is arranged to move said accumulating surface in a direction generally parallel to the direction of movement of said conveying member.

5. The conveying system of claim 3, wherein said drive means comprises a series of vibrating units located in spaced relation along the length of the accumulating surface with each vibrating unit operable to oscillate said accumulating surface.

6. The conveying system of claim 5, and including operating means for independently operating each vibrating unit when the containers accumulate on said surface to a position in the operating zone of each vibrating unit.

7. The conveying system of claim 6, wherein the operating means is responsive to the pressure of the accumulated containers.

8. The conveying system of claim 1, and including an intermediate member disposed between the side edge of said conveying member and the adjacent edge of said accumulating surface, said intermediate member being disposed at an acute angle of less than 3° with respect to said plane.

9. The conveying system of claim 8, wherein said intermediate member is plastic.

10. The conveying system of claim 1, including a second accumulator member having means for disposing said second accumulator member laterally of the conveyor member on the opposite side of said conveyor member from said first accumulator member, said second accumulator member having a generally flat second accumulating surface disposed at an acute angle in the range of 3° to 8° with respect to said plane and said second accumulating surface having an edge located adjacent to a side edge of the conveyor member whereby articles can pass freely from the conveyor member to the second accumulating surface of said second accumulating member, and means for mounting said second accumulating surface at said downwardly inclined angle.

11. In a conveying system, first conveyor means to convey a plurality of articles and having a first conveying surface disposed in a first plane, second conveyor means to convey said articles and located in spaced relation to said first conveyor means, said second conveyor means including a second conveying surface disposed in a second plane parallel to the first plane and at a lower level than said first plane, and an accumulator member extending between said first conveying surface and second conveying surface, said accumulator member being generally flat and disposed at an angle of 3° to 8° with respect to said planes and having a pair of opposed edges, one of said edges being located adjacent to and at approximately the same level as a side edge of the first conveying surface and a second of said edges being located adjacent to and at approximately the same level as the side edge of the second conveying surface whereby the articles can pass freely from the first conveying surface downwardly across the accumulator member to said second conveying surface, said accumulator member is elongated and the length of said accumulator member is parallel to said conveying surface.

12. The conveying system of claim 11, and including an intermediate member located between the side edge of each conveying surface and the adjacent edge of said accumulator member, each of said intermediate members being located at an acute angle up to 3° with respect to said planes.

13. The conveying system of claim 11, and including a sheet of plastic material disposed on said accumulating member and being substantially coextensive therewith.

14. The conveying system of claim 11, and including guide means for guiding said articles in a path of travel from said first conveyor means across said accumulator member to said second conveyor means.

15. The conveying system of claim 11, and including vibrating means for vibrating said accumulator member to thereby increase the speed of travel of said articles over said member.

16. The conveying system of claim 15, wherein said vibrating means is arranged to move the accumulator member in a reciprocating path of travel in a direction from the first conveyor means to the second conveyor means.

* * * * *